(12) United States Patent
Liang

(10) Patent No.: US 7,113,394 B2
(45) Date of Patent: Sep. 26, 2006

(54) MULTIPURPOSE EXTRACTABLE KEYBOARD MODULE CARTRIDGE

(76) Inventor: Hsien-Rong Liang, P.O. Box No. 6-57, Junghe, Taipei 235 (TW)

( * ) Notice: Subject to any disclaimer, the term of this patent is extended or adjusted under 35 U.S.C. 154(b) by 316 days.

(21) Appl. No.: 10/847,571

(22) Filed: May 18, 2004

(65) Prior Publication Data

US 2005/0259386 A1  Nov. 24, 2005

(51) Int. Cl.
*G06F 1/16* (2006.01)
*H05K 7/10* (2006.01)
(52) U.S. Cl. .................. 361/680; 717/125; 709/201
(58) Field of Classification Search ........ 361/679–687, 361/724–727; 717/124, 125, 104, 105; 711/115; 708/130; 709/201, 203; 455/573, 90; 439/928.1
See application file for complete search history.

(56) References Cited

U.S. PATENT DOCUMENTS 5,608,608 A * 3/1997 Flint et al. ............... 361/686
6,317,314 B1 * 11/2001 Kung et al. ............... 361/680
6,895,419 B1 * 5/2005 Cargin et al. ............. 708/131
2002/0085343 A1 * 7/2002 Wu et al. .................. 361/683

* cited by examiner

*Primary Examiner*—Hung Van Duong

(57) ABSTRACT

A multipurpose extractable keyboard module cartridge, which is constructed to include a module cartridge and a keyboard. Structural characteristics include a plurality of connector ports configured at a side of the keyboard, wherewith enables connecting of digital products and devices, including electronic and electrical devices, computers, and so on. Furthermore, a connector terminal is configured on a circuit board of the module cartridge, whereby after inserting the module cartridge into a slot defined in the keyboard, the connector terminal inserts into a connector slot, whereupon the keyboard can directly read a memory card inserted into a connect slot of the module cartridge. In addition, a cover is configured atop the slot of the keyboard; whereby after removing the module cartridge, the cover can be placed over the slot and thereby prevent dust and miscellaneous objects from entering the slot.

3 Claims, 4 Drawing Sheets

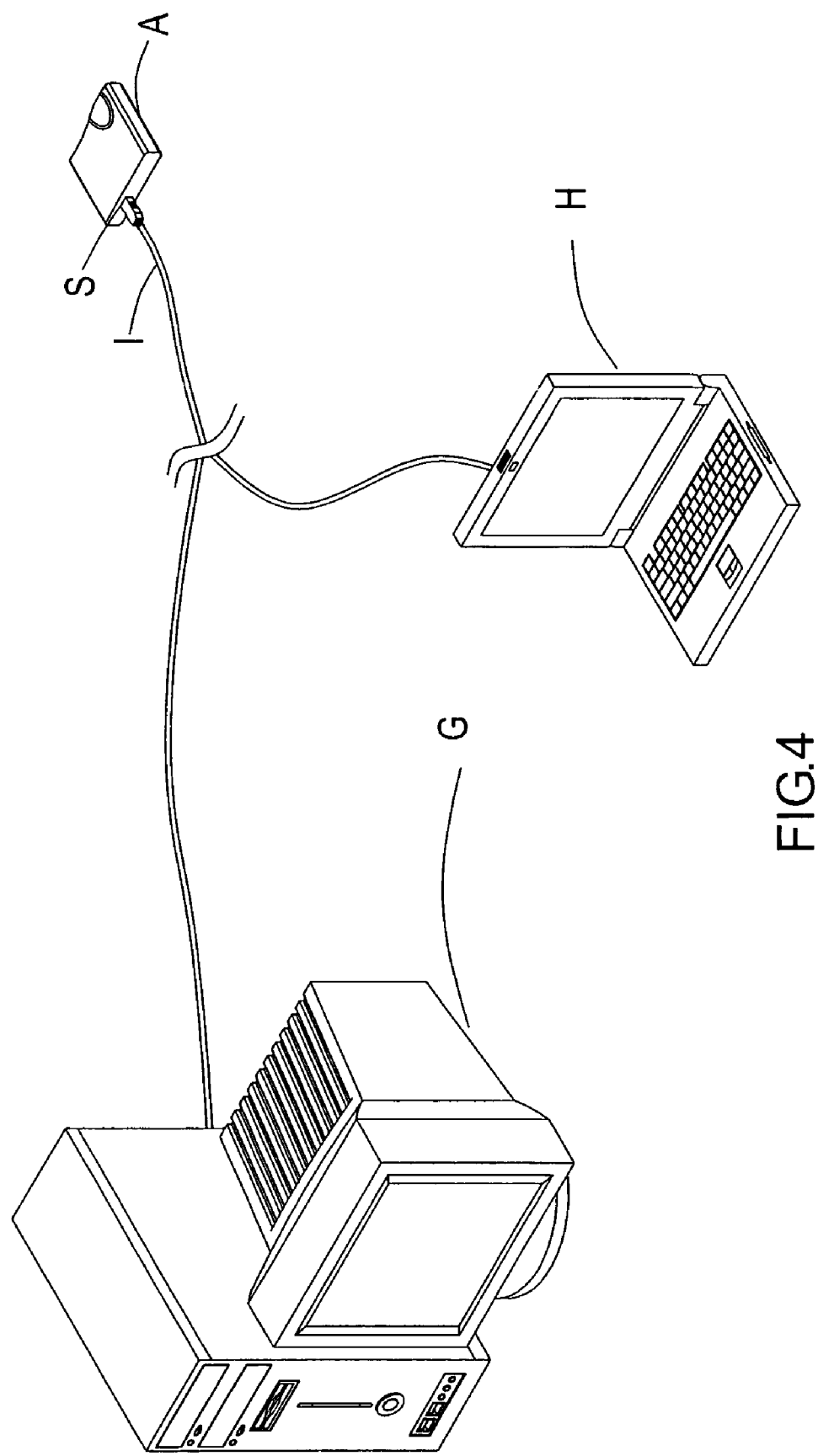

MULTIPURPOSE EXTRACTABLE KEYBOARD MODULE CARTRIDGE

BACKGROUND OF THE INVENTION (a) Field of the Invention

The present invention relates to a multipurpose extractable keyboard module cartridge, which is constructed to include a module cartridge and a keyboard.

(b) Description of the Prior Art

A conventional keyboard is used merely for keying in, and a connector slot must be utilized to provide the connection of the keyboard. Although a majority of current keyboards are configured with one PS-II or USB (Universal Serial Bus) port, the connector slot can only be utilized for keyboard connection and serves no other favorable functionality.

Popularization and utilization of memory cards and media PC are increased rapidly, and when using the memory card, utilization of a card reader is necessary to read digital date stored within the memory card. However, a connector terminal of the card reader is configured with the USB (Universal Serial Bus) port, and with present digital products, including digital cameras, scanners, printers, and so on, all being configured with the USB (Universal Serial Bus) port, necessity has resulted for a user to purchase an additional USB-HUB (Universal Serial Bus HUB), wherewith can provide for connecting of a large number of devices.

The inventor of the present invention was motivated in providing a peripheral device that is configured with functionality of multimedia keyboard, USB device and the card reader.

SUMMARY OF THE INVENTION

The present invention relates to a multipurpose extractable keyboard module cartridge, which is constructed to include a module cartridge and a keyboard. Structural characteristics include a plurality of connector ports configured at a side of the keyboard, wherewith enables connecting of digital products and devices, including electronic and electrical devices, computers, and so on. Furthermore, a connector terminal is configured on a circuit board of the module cartridge, whereby after inserting the module cartridge into a slot defined in the keyboard, the connector terminal inserts into a connector slot, whereupon the keyboard can directly read a memory card inserted into a connect slot of the module cartridge with swap and portable function. In addition, a cover is configured atop the slot of the keyboard; whereby after removing the module cartridge, the cover can be placed over the slot and thereby prevent dust and miscellaneous objects from entering the slot.

To enable a further understanding of the said objectives and the technological methods of the invention herein, the brief description of the drawings below is followed by the detailed description of the preferred embodiments.

BRIEF DESCRIPTION OF THE DRAWINGS

FIG. 4 shows a schematic view of another embodiment according to the present invention.

DETAILED DESCRIPTION OF THE PREFERRED EMBODIMENTS

Figure 1:
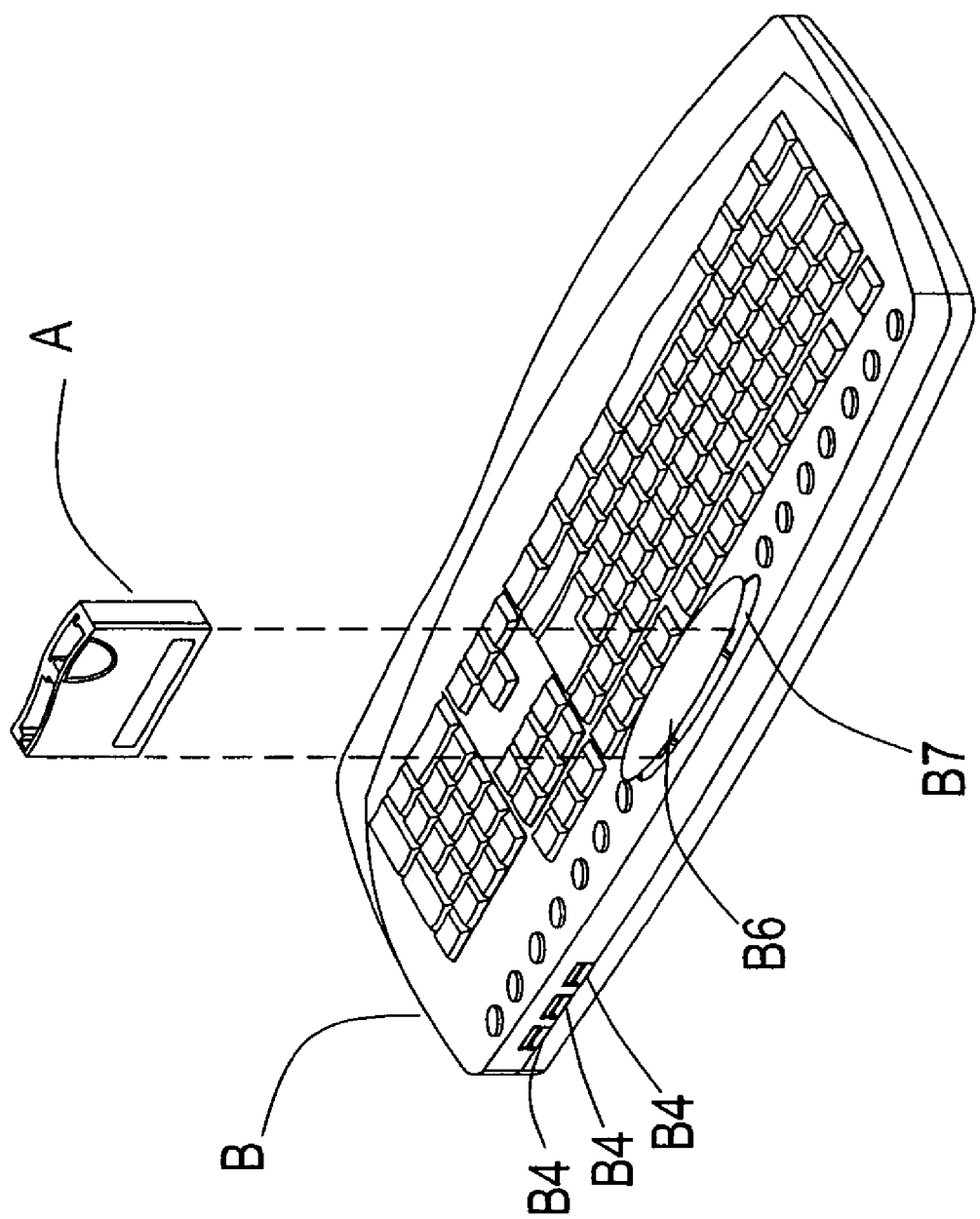
FIG. 1 shows an elevational view according to the present invention.
Figure 2:
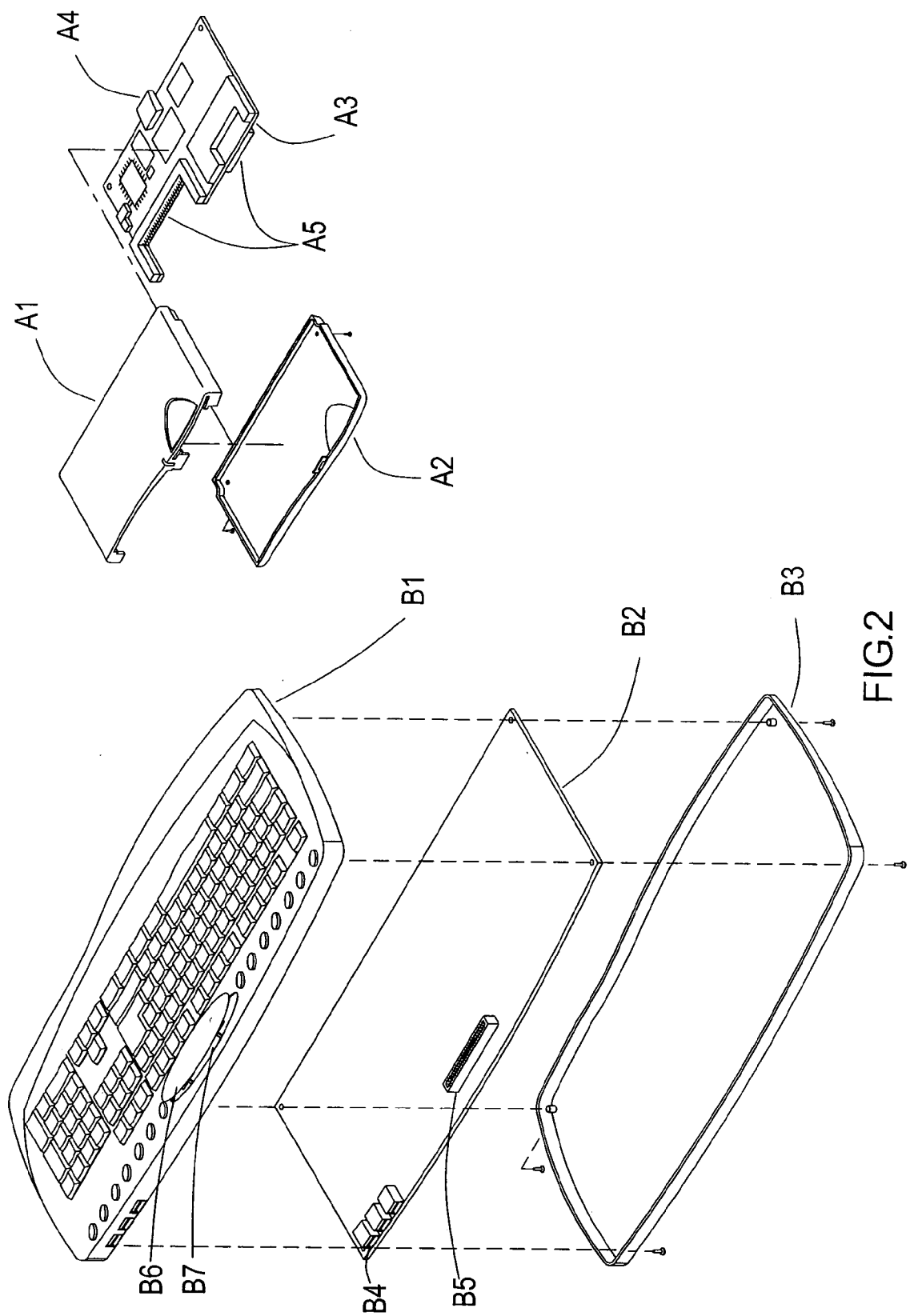
FIG. 2 shows an exploded elevational view according to the present invention.

The present invention provides a multipurpose extractable keyboard module cartridge, and as FIGS. 1 and 2 show, the present invention is constructed to include a module cartridge A and a keyboard B.

The module cartridge A is constructed to include a top cover A1, a bottom cover A2 and a circuit board A3. The circuit board A3 is disposed between the top cover A1 and the bottom cover A2, such a configuration is screwed together with screws.

The keyboard B is constructed to include a top cover B1, a circuit board B2, a base B3, and a cover B6. The circuit board B2 is disposed within the top cover B1, and after fitting the base B3 thereunder, such a configuration is screwed together with screws.

Figure 3:
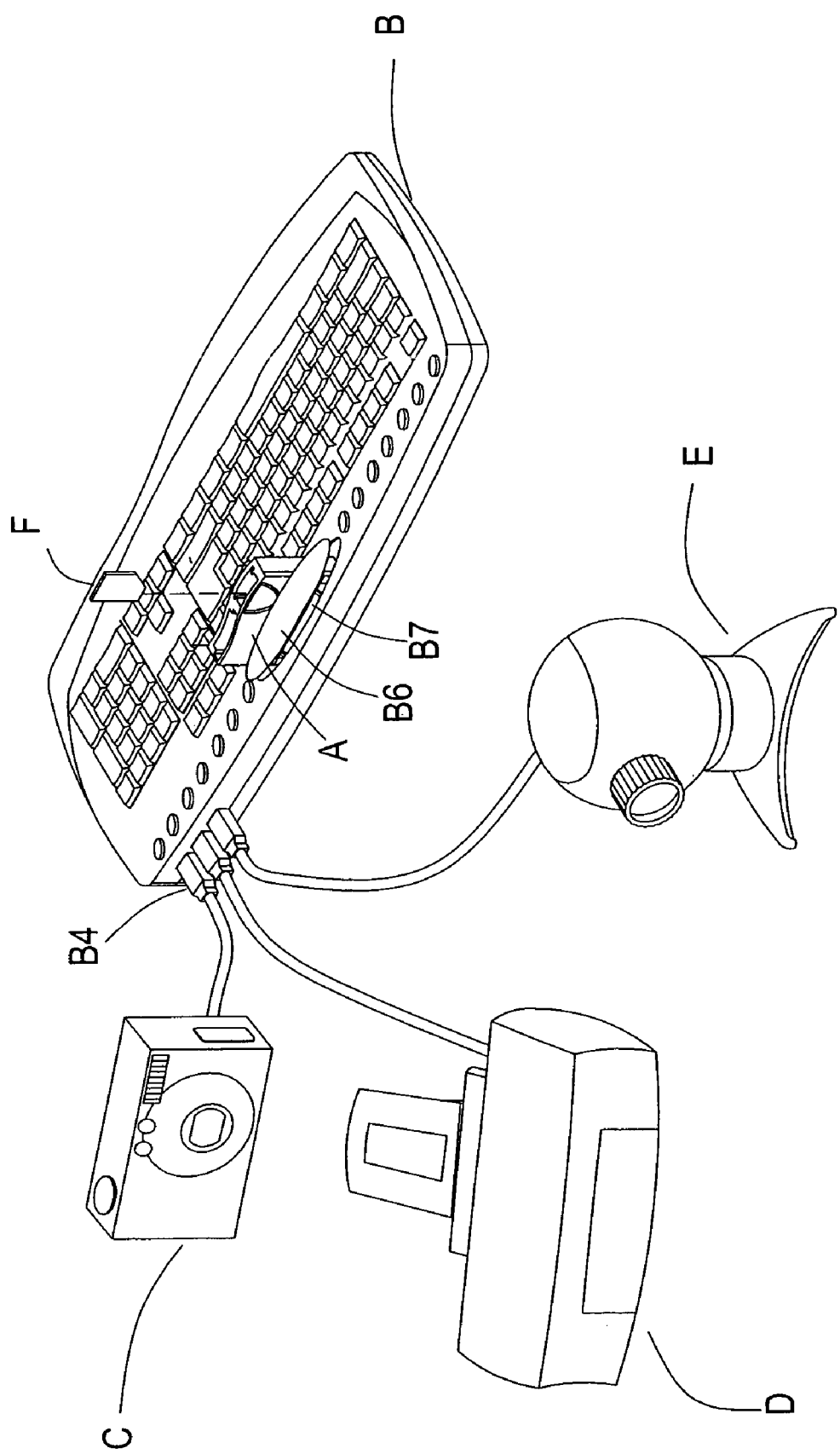
FIG. 3 shows a schematic view of an embodiment according to the present invention.

Structural characteristics of above configuration include a plurality of connector ports B4 configured on a side of the keyboard B, facilitating connection of relevant computer and digital devices thereinto. Furthermore, a connector terminal A4 is configured on the circuit board A3 of the module cartridge A, and upon inserting the module cartridge A into a slot B7 of the keyboard B, the connector terminal A4 is thereupon slotted into a connector slot B5. The keyboard B is thus enabled to directly read a memory card F inserted into a connector slot A5 of the module cartridge A (as depicted in FIG. 3). The cover B6 is configured atop the slot B7 of the keyboard B, whereby after extracting the module cartridge A from the keyboard B, the cover B6 can be placed over the slot B7, and thus cover the slot B7 thereof, thereby preventing dust and miscellaneous objects from entering the slot B7.

Wherein, the connector ports B4 and the connector slot B5 of the keyboard B and the connector terminal A4 of the module cartridge A are connectors as utilized in related electronic and electrical devices and digital products, including the USB port (Universal Serial Bus), COM1/COM2 communication ports, a printer port, and so on.

Wherein, the connector slot A5 of the module cartridge A is compatible with CF cards (Compact Flash Cards), MS cards (Memory Stick Cards), SM cards (Smart Media Cards), and related portable medium utilized for storing electronic digital data.

An embodiment of the present invention provides a multipurpose extractable keyboard module cartridge, and as FIG. 3 shows, the module cartridge A is inserted within a slot B7 of the keyboard B, whereupon the keyboard B directly reads a memory card F inserted into a connector slot A5 of the module cartridge A, thereby enabling access to digital date stored within the memory card F, and thereon transmits the digital data to other devices, including a computer, and so on. A plurality of connector ports B4 of the keyboard B can simultaneously connect to a digital camera C, a printer D, a network video camera E, and other related electronic and electrical devices and computer digital products by means of transmission cables I, thus relieving a user from purchasing an additional USB-HUB (Universal Serial Bus HUB).

Referring to FIG. 4, which shows one end of the transmission cable I connected to the connector terminal A4 of the module cartridge A, and another end of the transmission cable I connected to a personal computer G or a notebook computer H, thereby enabling separate employment of the module cartridge A. and thus realizing non-requirement for the module cartridge A to be first connected to the keyboard B, and therefore enhances practicability of the module cartridge A.

Practical features of the present invention are disclosed hereinafter in order to make more apparent advancement and practicability of the present invention:

1. Saving on number of the USB (Universal Serial Bus) connector ports utilized, thus relieving a user from purchasing an additional USB-HUB (Universal Serial Bus HUB).

2. The module cartridge A is an independent card reader, which can be separately employed or functioned in coordination with the keyboard B, thereby benefiting the user in employing the module cartridge A in a variety of circumstances.

3. Enhancement in functionality of the keyboard B, while simultaneously expanding number of connector ports of the computer.

4. Provided with advancement, practicability and convenience.

5. Enhances industrial competitiveness.

In conclusion, the present invention assuredly complies with essential items requisite in an application for a new invention patent. Accordingly, a patent application is proposed herein.

It is of course to be understood that the embodiments described herein is merely illustrative of the principles of the invention and that a wide variety of modifications thereto may be effected by people skilled in the art without departing from the spirit and scope of the invention as set forth in the following claims.

What is claimed is:

1. A multipurpose extractable keyboard module cartridge comprising a module cartridge and a keyboard, and is characterized in that:

the module cartridge comprises a top cover, a bottom cover and a circuit board, whereby the circuit board is disposed between the top cover and the bottom cover, and such a configuration is screwed together with screws;

the keyboard comprises a top cover, a circuit board, a base and a cover, whereby the circuit board is disposed within the top cover, and after fitting the base thereunder, such a configuration is screwed together with screws;

structural characteristics of aforesaid configurations comprise a plurality of connector ports configured on a side of the keyboard, which facilitate the connection of electronic and electrical devices, computer and digital devices thereinto; furthermore, a connector terminal is configured on the circuit board of the module cartridge, and upon inserting the module cartridge into a slot of the keyboard, the connector terminal is thereupon inserted into a connector slot, the keyboard is thus enabled to directly read a memory card inserted into a connector slot of the module cartridge; a cover is configured atop the slot of the keyboard, whereby after extracting the module cartridge from the keyboard, the cover can be placed over the slot, and thus cover the slot thereof, thereby preventing dust and miscellaneous objects from entering the slot.

2. The multipurpose extractable keyboard module cartridge according to claim 1, wherein the connector ports of the keyboard or the connector slot of the keyboard or the connector terminal of the module cartridge are connectors as utilized in related electronic and electrical devices and digital products, including a USB port (Universal Serial Bus), COM1/COM2 communication ports, a printer port, and so on.

3. The multipurpose extractable keyboard module cartridge according to claim 1, wherein the connector slot of the module cartridge is compatible with CF cards (Compact Flash Cards), MS cards (Memory Stick Cards), SM cards (Smart Media Cards), and related portable medium utilized for storing electronic digital data.

* * * * *